June 5, 1951 W. J. HOLT, JR., ET AL 2,555,544
SATURABLE TRANSFORMER REGULATED RECTIFIER
Filed June 14, 1949
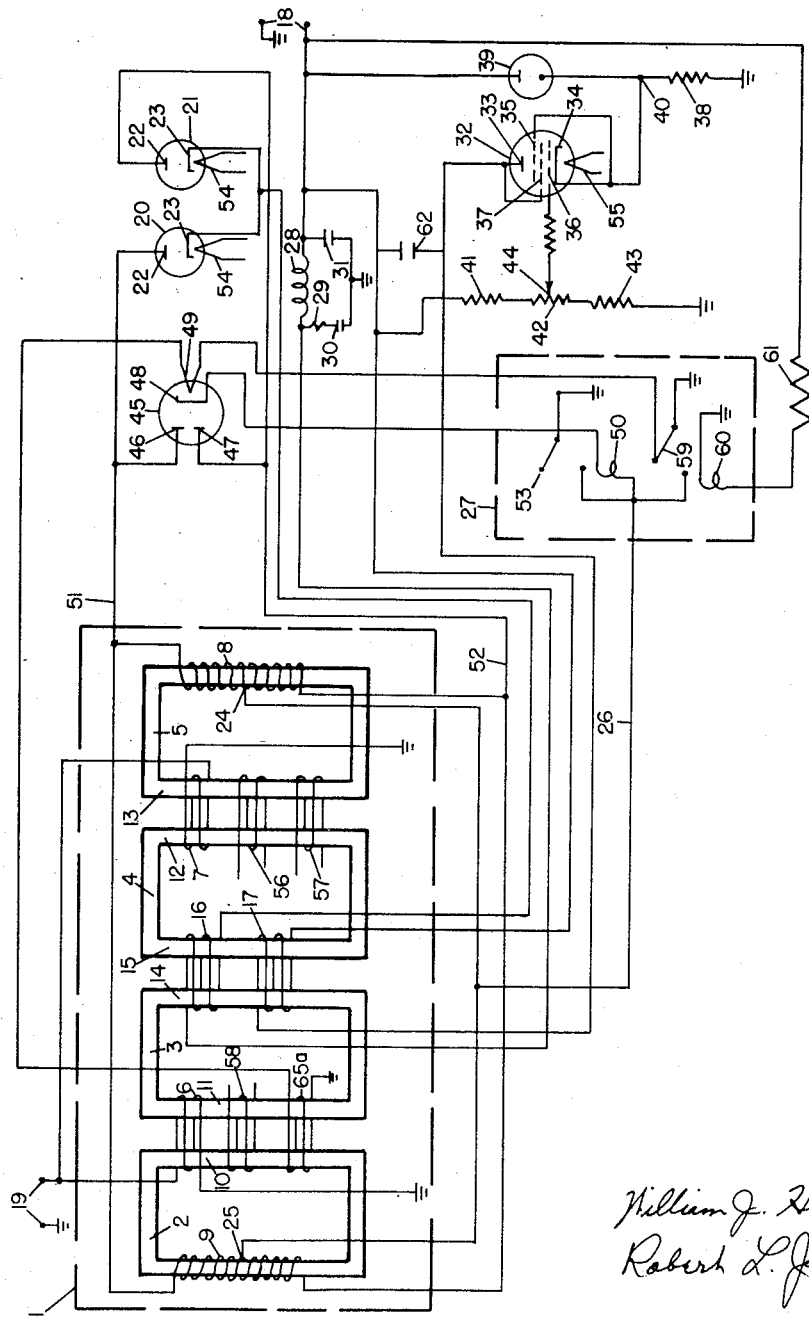
William J. Holt, Jr.
Robert L. Jordan
INVENTOR.

Patented June 5, 1951

2,555,544

UNITED STATES PATENT OFFICE 2,555,544

SATURABLE TRANSFORMER REGULATED RECTIFIER

William J. Holt, Jr., and Robert L. Jordan, Garland, Tex., assignors to Varo Mfg. Co., Inc., Garland, Tex., a corporation of Texas Application June 14, 1949, Serial No. 98,952

9 Claims. (Cl. 321—25)

Our invention relates to electrical control circuits and more particularly to improvements in control circuits for electric valves and voltage regulating systems.

This application is a continuation in part of Wm. J. Holt Jr.'s copending application having Serial Number 45,932, filed August 24, 1948. The invention disclosed in the above identified application relates to a saturable transformer. In our present invention, we employ the above disclosed transformer in an electric translating apparatus to provide a constant output voltage to a direct current load circuit.

An object of our invention is to provide a new and improved electric control system.

Another object of our invention is to provide a new and improved voltage regulating system.

A further object of our invention is to provide a new and improved voltage regulating system for an electric translating apparatus which supplies direct current to an associated load circuit from an alternating current source.

Briefly stated, in the illustrated embodiment of our invention, we provide an improved control circuit and voltage regulating system for supplying direct current from an alternating current supply circuit. The system comprises a transformer and unidirectional conducting means such as electric valves. The transformer is provided with a saturating winding which is variably energized by means of an electric discharge means which is connected across the load circuit. A voltage sensitive circuit and a voltage controlling circuit is also connected across the load to vary the conductivity of the electric discharge means, and, therefore, controls the current transmitted to the saturating winding to maintain the voltage across the load circuit constant. We also provide a control circuit which comprises an electric valve connected across the secondary windings of the transformer to activate a relay after a time delay to allow the electric discharge means time to be heated. This relay also acts to disconnect the unidirectional conducting means from the alternating current supply circuit in the event of an overload in the direct current load circuit.

For a better understanding of our invention, reference may be had to the following description taken in connection with the accompanying drawing.

In the accompanying drawing forming a part of this specification and in which like numerals are employed to designate like parts throughout the same, the single figure is a complete circuit diagram illustrating a preferred embodiment of our invention.

Referring now to the figure, the saturable transformer 1 comprises cores 2, 3, 4, and 5, primary windings 6 and 7 connected in parallel, and secondary windings 8 and 9 also connected in parallel. Primary winding 6 is wound around legs 10 and 11 of cores 2 and 3, respectively. Primary winding 7 is similarly wound around legs 12 and 13 of cores 4 and 5, respectively. Primary windings 6 and 7 are so wound that the magnetic flux set up in leg 14 by the alternating current in the primary winding 6 is equal and opposite to the magnetic flux set up in leg 15 by the primary winding 7. Saturating windings 16 and 17 are wound around legs 14 and 15.

Since the alternating magnetic flux in leg 14 is equal and opposite to the alternating magnetic flux in leg 15, the sum of the alternating magnetic fluxes in legs 14 and 15 is substantially zero. Little or no voltage is, therefore, induced in windings 16 and 17. It is now possible to magnetically saturate cores 3 and 4 by energizing windings 16 and 17 with direct current. The amount of flux in core 2 which is set up by the alternating current in primary winding 6 is controlled by the degree to which core 3 is magnetically saturated by the direct current in the saturating windings 16 and 17. If the direct current in the saturating windings 16 and 17 is increased, a greater portion of the alternating magnetic flux set up by the alternating current in primary winding 6 flows through core 2. The amount of alternating magnetic flux set up in core 5 by the primary winding 7 is similarly controlled by the amount of direct current flowing in saturating windings 16 and 17. Since the alternating voltage induced in the secondary windings 8 and 9 is directly proportional to the amount of flux in cores 2 and 5, the output voltage of the transformer can be regulated by varying the amount of direct current flowing in saturating windings 16 and 17. It is to be understood that only one saturating winding may be used instead of two as shown in this embodiment of our invention.

The output voltage of the above described saturable transformer, under conditions of constant saturation, is not changed appreciably by a change in frequency of the input voltage because the only electrical quantity changed in the transformer by a change in frequency is the flux density. This change in flux density changes the core loss only. Under actual operating conditions this variation in core loss does not appreciably affect the output voltage. Since the proportional distribution of the magnetic flux in the cores remains the same whatever the variation in frequency of the input voltage, the output voltage remains unaffected except for the above described very small variation caused by changes in core loss.

Our invention is diagramatically illustrated in the single figure of the drawing as a system for energizing a direct current load 18 from an alternating current source 19 through the rectifier system comprising transformer 1 and electric valves 20 and 21, which may be of the type comprising an anode 22 and a cathode 23. The secondary windings 8 and 9 of transformer 1 have their electrical midpoints 24 and 25 respectively, grounded through conductor 26 and a relay 27. The purpose and mode of operation of the relay means 27 will be explained later.

Electric valves 20 and 21 are connected to opposite sides of the secondary windings in a conventional manner to conduct both half cycles of alternating current from alternating current source 19 in rectified form to saturating winding 16 and load 18. A filter comprising a choke 28, resistance 29, and condensers 30 and 31 is connected between the load 18 and saturating winding 16 to reduce the ripple voltage. Saturating winding 16 is connected in series with electric valves 20 and 21 and carries the full current transmitted by the electric valves 20 and 21. Cores 3 and 4, therefore, are always partially magnetically saturated. The saturation of cores 3 and 4 will vary with the current transmitted by the electric valves 20 and 21. However, the saturation of cores 3 and 4 is further controlled by the direct current in saturating winding 17 as will now be explained.

We provide means responsive to fluctuations in the direct current voltage across load 18 to control the amount of current flowing in the saturating winding 17 and thus control the magnetic saturation of cores 3 and 4. This means comprises an electric discharge means 32, preferably of the high vacuum type, comprising an anode 33, a cathode 34, a suppressor grid 35 which is connected to the cathode, a control grid 36 and a screen grid 37 which is connected to the anode 33. Saturating winding 17 and electric discharge means 32 are connected in series and across the load 18 through resistance 38. Also connected across the load 18 through resistance 38 is a glow discharge valve 39 which acts as a voltage regulator since it maintains constant voltage drop regardless of small changes in its conducted current. Since cathode 34 is connected to the common juncture or connection 40 of the glow discharge valve 39 and resistance 38, the total variations in the voltage across the load will be impressed on cathode 34 because the voltage drop across glow discharge valve 39 will remain constant.

We provide a further voltage divider or potentiometer comprising resistances 41, 42 and 43 also connected across the load. A voltage control or voltage adjusting contact 44 connects control grid 36 and resistance 44 and impresses on the control grid 36 a potential which varies a fixed percentage of the voltage across the load. Since the change in the potential of the cathode 34 will be equal to the change in the load voltage while the change in the potential of the control grid 36 will always be a fixed fraction of the change in the load voltage, the variation in potential of the cathode 34 will be the main controlling factor affecting the conductivity of electric discharge means 32. For example, if the load voltage increases a certain amount, the potential of the cathode 34 will become more positive by the same amount. The control grid 36 will also become more positive but only a fractional amount of the load voltage change. In effect, the control grid 36 becomes more negative with respect to the cathode 34 and the conductivity of the electric discharge means 32 is decreased. If the load voltage drops, the conductivity of the electric discharge means 32 is increased. Since the saturating winding 17 current is directly controlled by the electric discharge means 32, the magnetic saturation of cores 3 and 4 will decrease when the load voltage increases and will increase when the load voltage decreases. The voltage in the secondary windings 8 and 9 will decrease when the magnetic saturation in cores 3 and 4 decreases and increase when it increases. The voltage of secondary windings 8 and 9 is thus made to vary indirectly as the load voltage. The electrical quantities of the various elements of our circuit are so chosen that the variation of the voltage of secondary windings 8 and 9 will be of such degree as to maintain the load voltage constant.

Damage to electric valves 20 and 21 may occur if the voltage of the secondary windings is applied before their cathodes are raised to operating temperature. The apparatus may also be damaged if it is subjected to an overload, such as a short circuit. We provide an electronic delay relay and an overload relay which provide protection against the above forms of damage and which constitute a re-cycling circuit. Our re-cycling circuit comprises a heater cathode type electric valve 45 which may comprise anodes 46 and 47, a cathode 48, and a heater element 49. Electric valve 45 is connected across secondary windings 8 and 9 since its cathode 48 is connected to the electrical midpoints 24 and 25 of the secondary windings 8 and 9 through a relay winding 50 and its anodes are connected to the outside leads 51 and 52 of the secondary windings 8 and 9. Relay winding 50 activates a contact 53 which, when activated, connects the electrical midpoints 24 and 25 of the secondary windings 8 and 9 to ground. When a voltage initially appears on the primary windings 6 and 7, electric valves 20 and 21 and electric discharge means 32 are not energized since the electrical midpoints 24 and 25 of secondary windings 8 and 9 are not connected to ground. Heater elements 54 of electric valves 20 and 21 and heater element 55 of electric discharge means 32, however, are immediately energized since they are directly connected to windings 56 and 57 on legs 12 and 13 and winding 58 on legs 10 and 11 of the saturable transformer 1. The heater elements 54 and 55 are connected to windings 56, 57, and 58 in a conventional manner (not shown). Electric valve 45 is energized immediately being connected to electrical midpoints 24 and 25 and heater element 49 of electric valve 45 is energized by winding 65a immediately since it is connected to ground through contact 59. After a short period of time, heater element 49 will heat cathode 48 to operating temperature and electric valve 45 will transmit sufficient current through relay winding 50 to actuate contact 53. Electrical midpoints 24 and 25 then become grounded and voltage from secondary windings 8 and 9 will be applied to electric valves 20 and 21 and electric discharge means 32.

The time delay between the application of alternating current voltage to primary windings 6 and 7 and the actuation of relay contact 53 provides sufficient time to allow electric valves 20 and 21 and electric discharge means 32 to be heated to a suitable operating temperature.

When an output voltage appears across the load 18, relay winding 60, being connected in series with a limiting resistance 61 across the load 18, is energized and actuates contact 59. Upon being actuated, contact 59 disconnects heater element 49 from ground and connects electrical midpoints 24 and 25 to ground. Heater element 49 now cools off and electric valve 45 ceases to conduct. Relay winding 50, therefore, is no longer energized and contact 53 is allowed to return to its initial position. Electric valve 45 is now in a stand-by condition. If an overload, such as a short circuit in a load, should occur, the current in relay winding 60 will decrease to a point at which contact 59 will no longer be actuated by relay winding 60. Contact 59 will return to its initial position, electrical midpoints 24 and 25 will be disconnected from ground, and output voltage will be removed from the load 18. Contact 59, however, will now connect heating element 49 to ground and the cycle of operation of relay means 27 will be repeated.

Condenser 62 is connected across saturating winding 17 to slow down the response of electric discharge means 32 to fluctuations in output voltage and thus prevent oscillation.

Important advantages of apparatus built in accordance with our invention are the simplicity of construction and arrangement, the facility and rapidity with which the apparatus responds to fluctuations of output voltage, and the great degree of protection afforded by the re-cycling circuit.

While we have shown and described our invention as applied to a particular system of connections and as embodying various devices diagrammatically shown, it will be obvious to those skilled in the art that changes and modifications may be made without departing from our invention and we, therefore, aim in the appended claims to cover all such changes and modifications as fall within the true spirit and scope of our invention.

What we claim as new and desire to secure by Letters Patent of the United States is:

1. In an electric translating apparatus for transmitting energy from an alternating current supply circuit to a direct current output circuit: magnetic core means providing two pairs of closed flux paths; a first primary winding connected across said supply circuit and operatively associated with one of said two pairs of flux paths for inducing alternating fluxes in said one of said two pairs of flux paths; a second primary winding connected across said supply circuit and operatively associated with the other pair of said two pairs of flux paths for inducing alternating fluxes in said other pair of said two pairs of flux paths; a first and a second saturating windings operatively associated with one flux path of each pair of said two pairs of closed flux paths for simultaneously and equally varying the saturation of the flux paths with which said first and second saturating windings are operatively associated, the fluxes in the flux paths with which said first saturating winding is operatively associated flowing in opposite directions with respect to said first and second saturating windings; a pair of secondary windings, one of said secondary windings being disposed on each of said flux paths not variably saturated by said first and second saturating windings; unidirectionally conducting means connected in series with said first saturating winding between said secondary windings and said output circuit; an electric discharge means provided with input electrodes including a control grid and a cathode and output electrodes including an anode and said cathode, said output electrodes being connected in series with said second saturating winding across said output circuit; and voltage sensing means operatively associated with said output circuit for impressing a voltage on said input electrodes which varies in accordance with the voltage of said output circuit.

2. In an electric translating apparatus for transmitting energy from an alternating current supply circuit to a direct current output circuit: magnetic core means providing two pairs of closed flux paths; a first primary winding connected across said supply circuit and operatively associated with one of said two pairs of flux paths for inducing alternating fluxes in said one of said two pairs of flux paths; a second primary winding connected across said supply circuit and operatively associated with the other pair of said two pairs of flux paths for inducing alternating fluxes in said other pair of said two pairs of flux paths; a first and a second saturating windings operatively associated with one flux path of each pair of said two pairs of closed flux paths for simultaneously and equally varying the saturation of the flux paths with which said first and second saturating windings are operatively associated, the fluxes in the flux paths with which said first saturating winding is operatively associated flowing in opposite directions with respect to said first and second saturating windings; a pair of secondary windings, one of said secondary windings being disposed on each of said flux paths not variably saturated by said first and second saturating windings; unidirectionally conducting means connected in series with said first saturating winding between said secondary windings and said output circuit; an electric discharge means connected in series with said second saturating winding across said output circuit; and control means operatively associated with said output circuit and said electric discharge means for varying the conductivity of said electric discharge means in accordance with the voltage of said output circuit.

3. In an electric translating apparatus for transmitting energy from an alternating current supply circuit to a direct current output circuit: a magnetic core means comprising four closed flux paths; a first primary winding connected to said supply circuit for inducing alternating fluxes in the first and second of said four closed flux paths; a second primary winding connected to said supply circuit for inducing alternating fluxes in the third and fourth of said four closed flux paths; first and second saturating windings operatively associated with said second and third flux paths for varying the saturation of said second and third flux paths, said primary windings inducing alternating fluxes in said second and third flux paths flowing in opposite directions with respect to said saturating windings; a first secondary winding operatively associated with said first flux path; a second secondary winding operatively associated with said fourth flux path, said alternating fluxes induced in said first and fourth flux paths inducing an alternating current in said secondary windings; unidirectionally conducting means connected in series with said first saturating winding between said secondary windings and said output circuit for energizing said first saturating winding and said output circuit with direct current; an electric discharge means connected in series with said second saturating winding across said output circuit; and means operatively associated with said output circuit and said electric discharge means for varying the conductivity of said electric discharge means in accordance with the voltage of said output circuit.

4. In an electric translating apparatus for transmitting energy from an alternating current supply circuit to a direct current output circuit: a magnetic core means comprising four closed flux paths; a first primary winding connected to said supply circuit for inducing alternating fluxes in the first and second of said four closed flux paths; a second primary winding connected to said supply circuit for inducing alternating fluxes in the third and fourth of said four closed flux paths; first and second saturating windings operatively associated with said second and third flux paths for varying the saturation of said second and third flux paths, said primary windings inducing alternating fluxes in said second and third flux paths flowing in opposite directions with respect to said saturating windings; a first secondary winding operatively associated with said first flux path; a second secondary winding operatively associated with said fourth flux path, said alternating fluxes induced in said first and fourth flux paths inducing an alternating current in said secondary windings; unidirectionally conducting means connected in series with said first saturating winding between said secondary windings and said output circuit for energizing said first saturating winding and said output circuit with direct current; an electric discharge means provided with input electrodes including a control grid and a cathode and output electrodes including an anode and said cathode, said output electrodes being connected in series with said second saturating winding across said output circuit; and voltage sensing means operatively associated with said output circuit for impressing a voltage on said input electrodes which varies in accordance with the voltage of said output circuit.

5. In an electric translating device for transmitting energy from an alternating current supply circuit to a direct current output circuit: magnetic core means providing four closed flux paths; a first primary winding energized by said alternating current supply circuit for inducing alternating fluxes in the first and second of said flux paths; a second primary winding energized by said alternating current supply circuit for inducing alternating fluxes in the third and fourth of said flux paths; secondary windings operatively associated with said first and fourth flux paths, said alternating fluxes in said first and fourth flux paths inducing an alternating current in said secondary windings; a first and a second saturating windings for saturating said second and third flux paths; unidirectionally conducting means connected in series with said first saturating winding between said secondary windings and said direct current output circuit for energizing said first saturating winding and said output circuit with direct current; an electric discharge means connected in series with said second saturating winding across said output circuit; and means responsive to the voltage of said direct current output circuit for varying the conductivity of said electric discharge device in accordance with the voltage of said output circuit.

6. In an electric translating device for transmitting energy from an alternating current supply circuit to a direct current output circuit: magnetic core means providing four closed flux paths; a first primary winding energized by said alternating current supply circuit for inducing alternating fluxes in the first and second of said flux paths; a second primary winding energized by said alternating current supply circuit for inducing alternating fluxes in the third and fourth of said flux paths; secondary windings operatively associated with said first and fourth flux paths, said alternating fluxes in said first and fourth flux paths inducing an alternating current in said secondary windings; a first and a second saturating windings for saturating said second and third flux paths; unidirectionally conducting means connected in series with said first saturating winding between said secondary windings and said direct current output circuit for energizing said first saturating winding and said output circuit with direct current; and means for variably energizing said second saturating winding with direct current from said output circuit in accordance with the voltage of said output circuit.

7. In an electric translating device for transmitting energy from an alternating current supply circuit to a direct current output circuit: magnetic core means providing four closed flux paths; a first primary winding energized by said alternating current supply circuit for inducing alternating fluxes in the first and second of said flux paths; a second primary winding energized by said alternating current supply circuit for inducing alternating fluxes in the third and fourth of said flux paths; secondary windings operatively associated with said first and fourth flux paths, said alternating fluxes in said first and fourth flux paths inducing an alternating current in said secondary windings; a first and a second saturating windings for saturating said second and third flux paths; unidirectionally conducting means connected in series with said first saturating winding between said secondary windings and said direct current output circuit for energizing said first saturating winding and said output circuit with direct current; an electric discharge device provided with output electrodes including an anode and a cathode and with input electrodes including a control grid and said cathode, said output electrodes being connected in series with said second saturating winding across said output circuit; and means operatively associated with said output circuit for impressing a voltage on said input electrodes which varies in accordance with the voltage of said output circuit.

8. In combination: an alternating current supply circuit; a direct current load circuit; electric translating apparatus comprising a transformer provided with a primary winding connected across said supply circuit, a secondary winding, and a pair of saturating windings, and unidirectionally conducting means connected in series with one of said pair of saturating windings between said secondary winding and said direct current load circuit; an electric discharge device having output electrodes including an anode and a cathode and input electrodes including a control grid and said cathode, said output electrodes being connected in series with the other of said pair of saturating windings; and voltage sensing means operatively associated with said input electrodes for impressing a potential on said input electrodes which varies in accordance with the voltage of said output.

9. The device of claim 8 in which said last-mentioned means comprises a first voltage divider bridge connected across said output circuit, said control grid being connected to said first bridge and having impressed upon it a substantially constant potential, and a second voltage divider comprising a glow discharge means and a resistance connected in series across said output circuit, the common connection of said glow discharge means and said resistance being connected to said cathode to impress upon it a potential which varies in accordance with the voltage of said output circuit.

WILLIAM J. HOLT, Jr.
ROBERT L. JORDAN.

No references cited.